United States Patent [19]

Polvara et al.

[11] Patent Number: 4,859,825

[45] Date of Patent: Aug. 22, 1989

[54] SPOT WELDING ELECTRODE AND METHOD FOR MAKING IT

[76] Inventors: Maria Polvara, Via Ponte Nuovo, 42, 20128 Milan; Giovanni Crosti, Via Buonarotti, 41, 20149 Milan; Sergio Lapo, Via Tolmezzo, 5, 33100 Udine, all of Italy

[21] Appl. No.: 122,288

[22] Filed: Nov. 18, 1987

[30] Foreign Application Priority Data

Nov. 26, 1986 [IT] Italy ................. 22465 A/86

[51] Int. Cl.⁴ ............................ B23K 35/00
[52] U.S. Cl. .................... 219/119; 419/11
[58] Field of Search ............ 219/119, 120; 419/11

[56] References Cited

U.S. PATENT DOCUMENTS

| | | | |
|---|---|---|---|
| 4,689,196 | 8/1987 | Leung | 419/11 |
| 4,699,763 | 10/1987 | Sinharoy et al. | 419/11 |
| 4,714,642 | 12/1987 | McAliley et al. | 57/243 X |

FOREIGN PATENT DOCUMENTS

| | | | |
|---|---|---|---|
| 1125866 | 6/1982 | Canada | 219/119 |
| 0174284 | 10/1984 | Japan | 219/119 |

*Primary Examiner*—Clifford C. Shaw
*Attorney, Agent, or Firm*—Bucknam and Archer

[57] ABSTRACT

The electrode comprises an electrically conductive body including, at least at its active portion, a sintered layer of silver powder having a particle size from 1 to 10 microns and crystalline graphite.

2 Claims, No Drawings

SPOT WELDING ELECTRODE AND METHOD FOR MAKING IT

BACKGROUND OF THE INVENTION

The present invention relates to an electrode which has been specifically designed for carrying out spot welding operations, as well as a method for making it.

As is known, in pressure spot welding operations and, in particular, in resistance spot welding operations, the welding heating is produced by the welding current passing through the contacting surfaces of the pieces to be welded: in this method, the electrode portion which is subjected to the greatest thermal and mechanical stress is the electrode end portion contacting one of the pieces to be welded.

In fact in this portion the welding current, which depends on the electrical resistance of the region to be welded and the voltage applied to the electrodes, is very high so as to reach the welding temperature in a short time in order to prevent heat losses from occurring.

Moreover, a suitable pressure must be applied to the welding region in order to properly clamping the pieces to be welded.

According to known making methods, the welding electrodes which, in addition to a high electric conductivity, must have good resistance characteristics, are made from electrolytic copper, the starting mechanical resistance of which is increased by means of molding or extruding operations.

In order to further increase the mentioned mechanical resistance, there are also used copper alloys (such as elconite, copper-beryllium alloys, copper-zirconium alloys, copper-chromium-zirconium alloys) which however, in respect of electrolytic copper, lead to a greater electric resistance with a consequent decreased conductivity.

Moreover, the shape of the electrode end portions must correspond to the characteristics of the pieces to be welded, and the electrode active surfaces are usually held in a cleaned condition by means of files or emery paper, or, if these surfaces are greatly worn, by means of turning operations.

As it should be apparent the above mentioned maintenance operations are rather tedious and complex and they must be carried out each time the electrode is oxidized and, hence, its active portion has a poor conductivity.

In fact, an oxidized active region leads to a deformation of the electrode operating part, because of the greater current intensity which must be applied to the electrode.

Moreover, as the electrode is very oxidized, the welding voltage is to be increased, in order to provide the required low welding resistance, which leads to the generation of electric arc.

In the switch electric contact field, or in the sliding contact field, there have been already used alloys consisting of silver and colloidal or amorphous graphite, including silver powder with a density of $3g/cm^2$, the component elements of said alloys being mixed in a ball mill. Because of the comparatively great size and ductility of the silver powder, said silver powder, during the mixing operation, is laminated and work-hardened and, accordingly, it can not be easily and properly compacted.

According to another method, the silver powder is carried out in a ball mill, by using colloidal water-dispersed graphite: however, also in this method, the silver powder is subjected to lamination and work-hardening.

The mixed silver powder is then compacted, and, during the compaction step, said silver powder is further work-hardened and layered, because of the comparatively large size of the silver powder particles.

The subsequent sintering step is carried out in a very long thermal cycle, of the order of several hours, in which water is slowly evaporated.

The thus obtained sintered material has a hardness from 40° to 75° Brinell, which is much smaller than the hardness for making spot welding electrodes.

In order to improve the mentioned small hardness values, to the silver powder other metal materials are added with a consequent decrease of the electric conductivity.

SUMMARY OF THE INVENTION

Accordingly, the main object of the present invention is to overcome the above mentioned drawbacks by providing an electrode, for spot welding operations, which is provided, at least at its active portion, with a practically inalterable surface which, in addition to having high electric conductivity values, does not require any maintenance operations.

Another object of the present invention is to provide a spot welding electrode able of achieving a high welding temperature in a short time, and which may also be used with very high welding currents.

Another object of the present invention is to provide a method for making the above spot welding electrodes which affords the possibility of making spot welding electrodes very reliable and devoid of any defects.

According to one aspect of the present invention, the above mentioned objects, as well as yet other objects, which will become more apparent hereinafter, are achieved by a spot welding electrode having an electrically conductive body, characterized in that it comprises, at least at its active portion, a silver powder sintered layer, with particle size from 1 to 10 microns, and crystalline graphite.

DESCRIPTION OF THE PREFERRED EMBODIMENT

The invention will become more apparent from the following detailed description of a preferred embodiment of a spot welding electrode, given by way of a not limitative example.

More specifically, the electrode according to the invention is made by providing a spot welding electrode body, of conventional shape, which advantageously, though not necessarily, may be made starting from electrolytic copper.

At its active portion, that is at the point portion of the electrode which will contact the pieces to be welded, there is applied a layer, which may consist of a sintered small plate which is applied to the electrode body by means of force fitting or mechanical anchoring means.

The mentioned sintered layer, or small plate, is made starting from a sintered extruded material comprising silver powder, of very fine particle size from 1 to 10 microns, which has been mixed with crystalline graphite.

The sintered and extruded material is prepared with a graphite contents of substantially 1 to 20%, the silver powder, which comprises the remaining portion, being present in a rate of substantially 99 to 80%.

For making the electrode, the silver powder and crystalline graphite components are dry mixed, under rolling and stirring, so as not to cause the silver powder particles to be work-hardened.

During the mixing step the crystalline graphite particles coat and "saponify" the silver powder particles, thereby perfectly homogenizing the mixture.

After the mixing step, the silver powder is subjected to a pressing operation at a pressure from 4,000 to 6,000 Kg/cm$^2$: in this way, since the compacted silver powder is not work-hardened, its particles are friction welded, because of their mutual sliding onto one another, which welding will be subsequently completed by means of a sintering step which is carried out for about 30 minutes at a temperature from 800° to 920° C.

The thus obtained sintered material is then extruded to provide the graphite particles with a filamentary morphology thereby improving the mechanical-physical properties of the sintered material during the working step and providing a sintered material which is very suitable for carrying out spot welding operations.

In particular, the extruded sintered material will have a hardness greater than 120 Brinell, that is substantially corresponding to the hardness of conventional spot welding electrodes, but with very high mechanical-physical properties.

Moreover a portion of the above disclosed sintered material may be coupled to a conventional spot welding electrode body, made of copper or copper alloys, by means of conventional molding methods and the like.

From the above disclosure, it should be apparent that the invention fully achieves the intended objects.

In particular the fact is to be pointed out that the use of the very reduced particle size silver powders, in combination with a crystalline graphite, provides a very homogeneous and even product which is very suitable for making spot welding electrodes.

Moreover the disclosed silver powder-crystalline graphite layer coating the electrode body protects the electrode from any oxidizing phenomena and overcome the need of carrying out descaling operations for holding the electrode in a proper operating condition.

While a preferred embodiment of the electrode according to the present invention has been thereinabove disclosed, it should be apparent that the disclosed embodiment is susceptible to several modifications and variations without departing from the spirit of the invention and scope of the accompanying claims.

We claim:

1. A method for making a sintered material adapted to form an active portion of a spot welding electrode, said method consisting of:
    (a) a step of dry mixing, under rolling and stirring, from 99 to 80% by weight of a silver powder, and from 1 to 20% by weight of crystalline graphite particles, said silver powder including silver particles having a particle size from 1 to 10 microns, said dry mixing step providing a mixture in which said crystalline graphite particles cover said silver particles;
    (b) a step of pressing, at a pressure from 4000 to 6000 Kg/cm$^2$, said mixture;
    (c) a step of sintering said mixture at a temperature from 800° to 920° C. and for substantially 30 minutes and
    (d) a step of extruding the sintered mixture so as to provide said active portion of said spot welding electrode.

2. A sintered material adapted to form at least an active portion of a spot welding electrode, said sintered material being made by the method according to claim 10 and consisting of a sintered layer made of 99 to 80% by weight of a silver powder having a particle size from 1 to 10 microns and of 1–20% by weight of a crystalline graphite particles, wherein said crystalline graphite particles cover said particles of said silver powder.

* * * * *